J. Bundy,
Wood Fence.

No. 59,176.                Patented Oct. 30, 1866.

Witnesses:
F. A. Jackson
Alex F. Roberts

Inventor:
J. Bundy
Per Mirmer
Attorney

UNITED STATES PATENT OFFICE.

JONATHAN BUNDY, OF WEST LIBERTY, IOWA.

IMPROVEMENT IN FENCE.

Specification forming part of Letters Patent No. 59,176, dated October 30, 1866.

*To all whom it may concern:*

Be it known that I, JONATHAN BUNDY, of West Liberty, in the county of Muscatine and State of Iowa, have invented a new and useful Improvement in Fence; and I do hereby declare that the following is a full, clear, and exact description thereof, which will enable those skilled in the art to make and use the same, reference being had to the accompanying drawings, forming part of this specification, in which—

Figure 1:
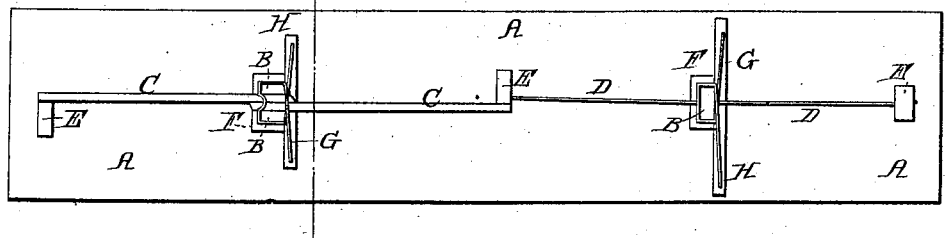
Figure 2:
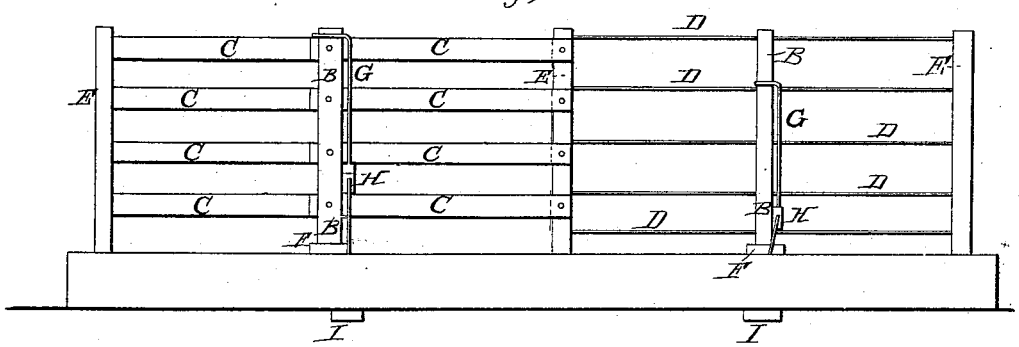
Figure 3:
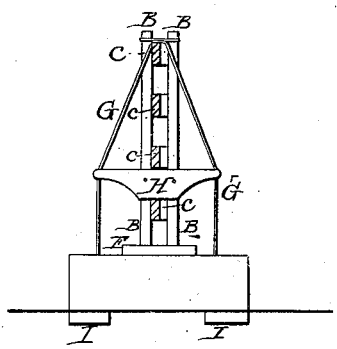

Figure 1 is a top view of a portion of a fence illustrating my invention. Fig. 2 is a side view of the same. Fig. 3 is a vertical cross-section of the same, taken through the line $x$ $x$, Fig. 1.

Similar letters of reference indicate corresponding parts.

My invention consists in the combination and arrangement of the blocks or cross-pieces, wires, and anchoring-stones with each other and with the fence-posts, for the purpose of sustaining said posts in a vertical position upon their supporting-stones and enabling the fence to resist a side pressure.

A represents the ground. B are the fence-posts or the vertical bars of the panels. C are the horizontal bars of the panels, and D the horizontal wires when the improvement is applied to a wire fence. E are ordinary fence-posts.

In my improved fence I place the lower ends of the posts B upon the flat stones F, resting upon or bedded in the surface of the ground, so that the said lower ends of the posts may be preserved from the rapid decay consequent upon the absorption of moisture from the ground.

When my invention is applied to a panel-fence the posts B may be either ordinary posts, to which the ends of the horizontal bars C are attached in the ordinary manner, or they may be vertical bars attached on each side of the fence to the overlapped ends of the said horizontal bars, as shown in Figs. 1, 2, and 3.

G are the wires, the middle part of which is passed around the upper part of the posts, crossing each other at the upper edge of the horizontal bar C or wire D, above which the said wire G is passed around the posts, and descending thence on each side of the fence.

When the posts B are vertical bars attached to each side of the overlapped ends of the horizontal bars C, I prefer to pass the wire G around the upper ends of the posts B just above the upper horizontal bar of the fence, as the said wire there assists in holding the said upper ends more securely together; but when an ordinary post is used, or when the improvement is attached to a wire fence, I pass the wire G around the post just above the horizontal bar or wire next below the top one, as shown in Fig. 2.

H are cross-pieces or blocks, securely attached to the sides of the posts B near their lower ends, as shown in Figs. 2 and 3, the ends of which project on each side of the fence, and are perforated for the passage of the wire G, as shown in Fig. 3. The cross-pieces H, being attached to the uprights B B, serve to connect these pieces more securely together, thus making a stronger fence. They likewise serve as supports for the horizontal bars C C when applied to the board fence, as shown in Fig. 2; but their principal use is in protecting the wires G from breakage, as any danger—such as from cattle running against the wires G, and thereby endangering the breaking of them—would in a great measure be obviated, as the strain would first be on the cross-pieces H, which are securely nailed to the uprights or posts, and this connection of the cross-pieces with said uprights would have first to be broken before any strain would be had upon the wires G. The ends of the wire G, after passing through the ends of the cross-piece H, are attached to the flat stones I, and are of such a length as to allow the said stones to be buried a sufficient depth in the ground to hold the fence securely.

In erecting the fence I place the lower ends of the posts B upon the stones F, and then drop the stones I into holes dug in the ground for their reception, pressing them down so as to draw the wires G taut, and packing the earth about and upon them so as to hold them securely in place.

I claim as new and desire to secure by Letters Patent—

The combination and arrangement of the blocks or cross-pieces H, wires G, and anchoring-stones I with each other and with the fence-posts B, substantially as herein shown and described, and for the purpose set forth.

JONATHAN BUNDY.

Witnesses:
J. W. SCRANTON,
ASA GREGG.